United States Patent [19]

Induni

[11] Patent Number: 5,009,465
[45] Date of Patent: Apr. 23, 1991

[54] ROLL-UP ROOF COVERING FOR AUTOMOBILES WITH REMOVABLE ROOF PANELS

[76] Inventor: Michael L. Induni, 5873 Dogwood La., Johnston, Iowa 50131

[21] Appl. No.: 85,372

[22] Filed: Aug. 14, 1987

[51] Int. Cl.⁵ .............................................. B60J 7/10
[52] U.S. Cl. .................................. 296/219; 296/218; 160/327
[58] Field of Search .............. 296/37.16, 98, 100, 296/136, 219, 95 C, 218; 160/327, 368 S, 370.2

[56] References Cited

U.S. PATENT DOCUMENTS

| 230,487 | 7/1880 | Miller | 160/327 |
|---|---|---|---|
| 2,785,003 | 3/1957 | Zaravsey | 296/135 X |
| 3,062,381 | 11/1962 | Maiden | 160/327 X |
| 3,072,006 | 1/1963 | Jurkowski | 160/327 X |
| 3,563,594 | 2/1971 | London | 296/98 X |
| 4,222,601 | 9/1980 | White et al. | 296/37.16 |
| 4,475,764 | 10/1984 | Hutchinson et al. | 296/219 X |

FOREIGN PATENT DOCUMENTS

| 1465426 | 1/1967 | France | 296/219 |
|---|---|---|---|
| 446087 | 3/1968 | Switzerland | 296/95 C |

Primary Examiner—Dennis H. Pedder
Attorney, Agent, or Firm—Zarley, McKee, Thomte, Voorhees & Sease

[57] ABSTRACT

At T-type sports car includes a roll-up type covering which may be used at times in lieu of the standard glass panels. The covering includes a locking assembly on each end which has opposed rods spring biased into roof openings normally used to lock the glass panels in place. Magnets are also provided along the bottom side of the roof covering to provide a seal across the windshield and along the roof at the rear.

4 Claims, 1 Drawing Sheet

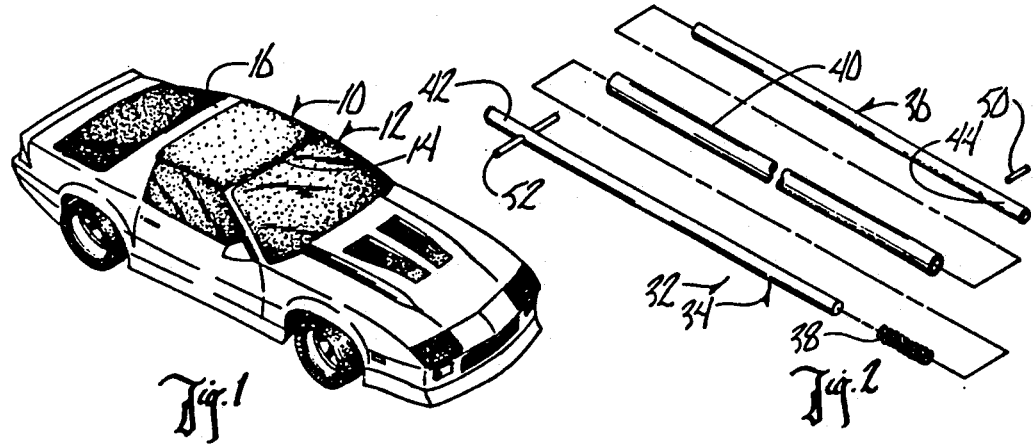
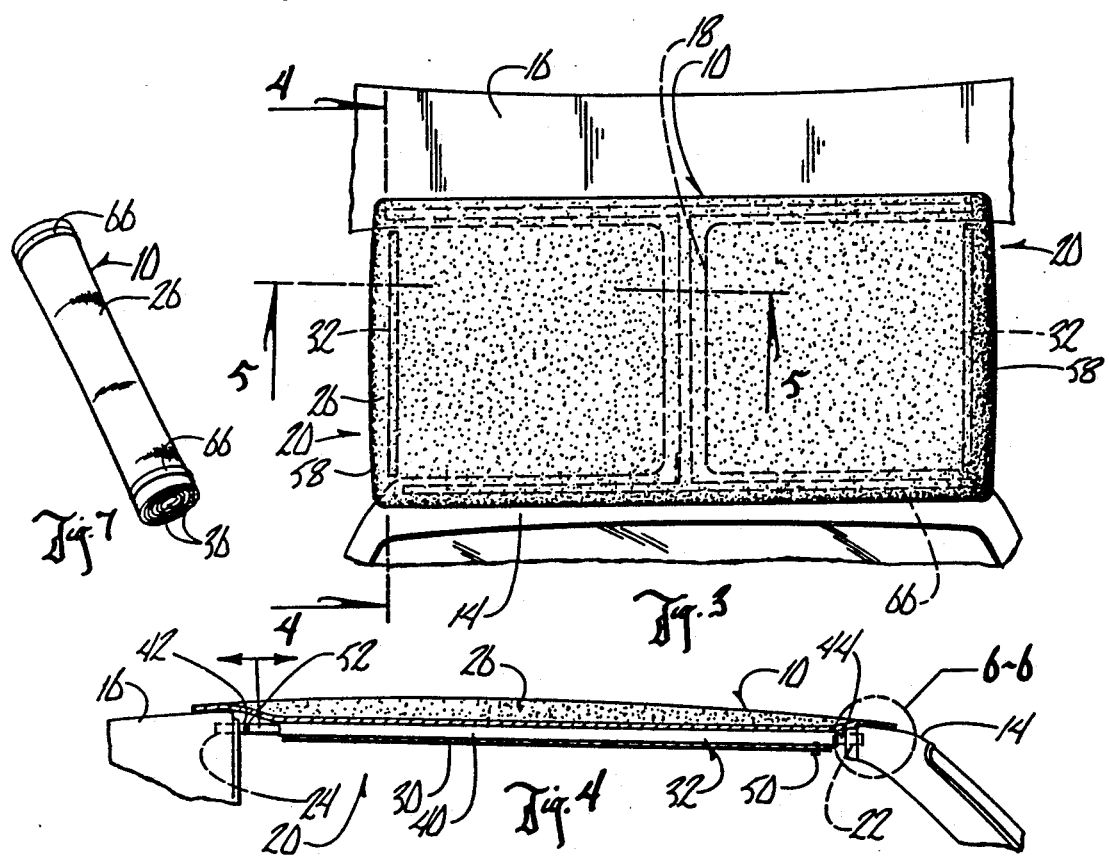
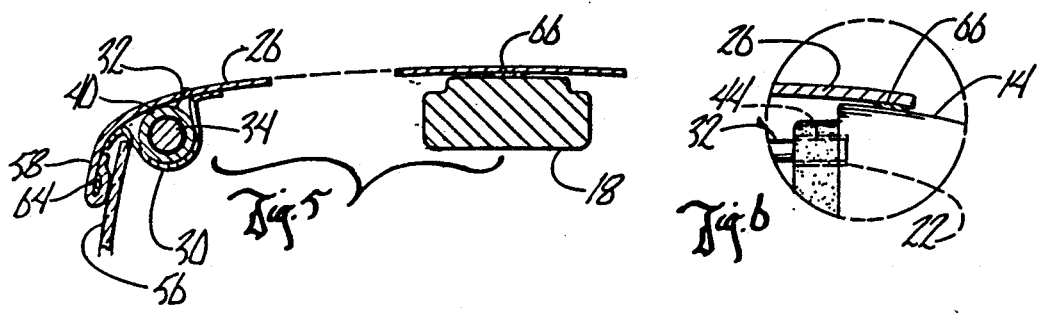

ROLL-UP ROOF COVERING FOR AUTOMOBILES WITH REMOVABLE ROOF PANELS

BACKGROUND OF THE INVENTION

In recent years, one of the more popular cars has been the T-type sports car which has removable roof panels. The panels are generally made out of glass and can be stored in the vehicle when not in use. These panels, while being easy to install and remove, can be bothersome if they are put on and taken off frequently, and can be easily stolen when stored in the automobile, for the vehicles on which these are used usually do not have any hidden storage areas in which the panels can be placed out-of-sight.

SUMMARY OF THE INVENTION

A roll-up roof covering is provided which may be readily installed, removed and stored. The covering spans the oppositely disposed U-shaped openings in the roof and is secured to the vehicle body utilizing the same front and rear body openings used to secure the permanent panels. Opposed spring biased rods are secured in sleeves on the bottom side of the roof covering, and the outer ends of the rods are received in the front and rear body openings. The roof covering extends beyond the sleeves and the rods and forms flaps which extend over the upper edges of the roll-up side windows, thereby making the locking assemblies not visible from the exterior of the vehicle.

Magnetic strips are provided along the front and rear bottom surface of the roof covering to engage the windshield and roof to secure the roof covering and seal the interior of the vehicle from the elements. Additional magnetic means are provided along the center line of the roof covering to engage the T-top crossbar which extends from the windshield to the rear of the car body.

DESCRIPTION OF THE DRAWINGS

FIG. 1 is a perspective view of a vehicle utilizing the roll-up roof cover of this invention.

FIG. 2 is an exploded perspective view of the locking assembly.

FIG. 3 is a fragmentary top plan view of the rollup cover on a vehicle.

FIG. 4 is a cross-sectional view taken along line 4—4.

FIG. 5 is a fragmentary cross-sectional view taken along line 5—5 in FIG. 3.

FIG. 6 is an enlarged fragmentary cross-sectional view, as indicated in FIG. 4.

FIG. 7 is a perspective view of the roll-up cover rolled up for storage.

DESCRIPTION OF THE PREFERRED EMBODIMENT

The vehicle roll-up roof covering of this invention is referred to generally in FIG. 1 by the reference numeral 10, and is shown on a Chevrolet Camaro automobile (12). The car (12) includes a windshield (14) and a rear roof (16) interconnected by a T-top cross bar (18). U-shaped roof openings (20) are provided on opposite sides of the cross bar (18). These openings, at times, may be closed by glass panels (not shown) which have locking pins received in front and rear openings (22 and 24), as seen in FIG. 4.

The roll-up roof covering pin includes an elongated sheet of material (26) which extends the width of the car over the U-shaped openings (20). This material may be of vinyl, fabric or the material used in convertible tops. The opposite ends of the roof covering include sleeves (30) on the bottom side in which locking assemblies (32) are received.

The locking assembly (32), as seen in FIG. 2, includes a pair of rods (34 and 36) in opposed end-to-end relationship, spring biased outwardly by a spring (38). The rods are received along with the spring in a tube (40), which in turn, is received in the sleeve (30) on the bottom side of the flexible sheet (26). The outer ends (42 and 44) of the rods (34 and 36) are received in the openings (24 and 22, respectively) of the car body.

As seen in FIGS. 2 and 4, a pin (50) extends through the rod (36) and the tube (40), and also the sleeve (30) to restrict movement there between. The rod (34) is moveable within the tube (40) against the action of the spring (38) which normally pushes it outwardly. An actuating pin (52) adjacent to the outer end (42) of the rod (34) provides a handle for moving the rod into and out of the opening (24) the in car body.

In FIG. 5, the car side windows (56) are seen engaging the roof (10) on the bottom side between a flap portion (58) and the sleeve (30). The windows (56) and the flap (58) obscure the locking assembly (32) from being visible from the exterior of the vehicle.

Ballast weights (64) are provided in the flaps (58) to keep them down and against the windows (56). Strips of magnets (66) are provided on the bottom side of the roof cover to secure the cover to the windshield (14) and the rear body roof (16), as well as along the T-top cross bar (18). The magnets help to seal the cover tight against the body of the car to prevent wind and external elements from entering the car.

It is seen in operation that the rolled-up roof cover (10) may be easily stored in the car, and when needed, unrolled and quickly put in place by operation of the locking assembly (32), by simply moving the rod (34) against the spring (38). The end (44) of the rod (36) is placed in the opening (22) in the car body, while the end (42) of rod (34) is put in the opening (24), and the roll-up roof cover (10) is locked in place, ready for vehicle use. The magnets (66) will automatically secure themselves to the vehicle body, and the weight (64) will help to provide sealing around the windows (56). Removal of the roll-up roof (10) is simply accomplished by reversing the procedure, which includes retracting the rod (34) against the spring (38) and removing the ends of the rods (34 and 36) from the body openings (22 and 24), and then rolling up the sheet (26) into the roll, as seen in FIG. 7, for storage purposes.

What is claimed is:

1. A vehicle having a roll-up roof covering with the vehicle body having U-shaped roof openings on opposite sides of a longitudinal center line roof member extending between the windshield and rear of the roof, said body having opposite side windows and said roof on opposite sides adjacent said side windows including front and rear body openings for at times securing roof panels in place, and at other times for securing a roll up roof covering, said roll-up roof covering comprising:

a cover sheet of flexible material having opposite ends extending over said vehicle covering said U-shaped roof openings, a locking assembly on opposite ends of said cover sheet engaging said front and rear body openings to secure said cover sheet in a covering position over said U-shaped roof openings, and each of said locking assemblies including a pair of opposed rod means having outer ends respectively received in said front and rear openings in the vehicle body, and one of said rod means being longitudinally moveable relative to the other rod means for engagement and disengagement with the associated body opening.

2. The structure of claim 1 wherein each of said locking assemblies includes a spring means for normally biasing one of said rod means into said associated body openings.

3. The structure of claim 2 wherein said rod means are secured to said cover sheet by each being positioned in a sleeve on the bottom side of said cover sheet.

4. The structure of claim 3 wherein said cover sheet at each of its ends extends beyond each of said sleeves and forms flaps below said sleeves which overlap the upper ends of said side windows in the vehicle body.

* * * * *